(12) United States Patent
Hamichi

(10) Patent No.: US 7,684,992 B2
(45) Date of Patent: Mar. 23, 2010

(54) REMOTE APPLICATION CORRECTION

(75) Inventor: Farid Hamichi, Nagaoka (JP)

(73) Assignee: Gemalto SA, Maudon (FR)

( * ) Notice: Subject to any disclaimer, the term of this patent is extended or adjusted under 35 U.S.C. 154(b) by 1329 days.

(21) Appl. No.: 10/514,947

(22) PCT Filed: May 28, 2003

(86) PCT No.: PCT/IB03/02251

§ 371 (c)(1),
(2), (4) Date: Nov. 18, 2004

(87) PCT Pub. No.: WO03/103155

PCT Pub. Date: Dec. 11, 2003

(65) Prior Publication Data

US 2005/0159183 A1 Jul. 21, 2005

(30) Foreign Application Priority Data

May 30, 2002 (EP) ................................... 02077117
Oct. 1, 2002 (EP) ................................... 02292415

(51) Int. Cl.
*G10L 21/00* (2006.01)
(52) U.S. Cl. ........................... 704/273; 704/8; 717/101; 717/103; 717/106

(58) Field of Classification Search ................. 704/227, 704/228, 1, 7, 270, 8, 273; 717/173, 171, 717/162, 101, 103, 106, 168; 713/165
See application file for complete search history.

(56) References Cited

U.S. PATENT DOCUMENTS

| 5,052,040 | A | * | 9/1991 | Preston et al. ............... 713/165 |
| 6,167,567 | A | * | 12/2000 | Chiles et al. ................. 717/173 |
| 6,915,513 | B2 | * | 7/2005 | Duesterwald et al. ........ 717/168 |
| 7,055,146 | B1 | * | 5/2006 | Durr et al. ................... 717/162 |
| 7,251,812 | B1 | * | 7/2007 | Jhanwar et al. .............. 717/171 |

* cited by examiner

*Primary Examiner*—Huyen X. Vo
(74) *Attorney, Agent, or Firm*—Pehr Jansson; The Jansson Firm

(57) ABSTRACT

A data processing system (CAR), particularly a smart card coupled to a communication device (MOB), communicating with a remote entity (OP). The data processing system has a location for storing a file (F) which can be downloaded from said remote entity, A program (GS) of the data processing system performs the following steps: before performing data correction in the system, a checking step in which said program (GS) checks whether a file (F) has been downloaded, if such a file (F) is present, the program (GS) modifies the application (APP) on the basis of the data stored in the file (F).

7 Claims, 1 Drawing Sheet

REMOTE APPLICATION CORRECTION

BACKGROUND OF THE INVENTION

1. Field of the Invention

This invention deals with a method to correct data in a data processing system remotely. The example chosen to illustrate the invention is that of the smartcard, particularly a SIM (Subscriber Identity Module) card coupled to a Portable object (Mobile phone, PDA, etc.).

Generally, this invention can be applied to all the smart card industry and not only the GSM (Global System for Mobile Communication) industry. That means for all other smart cards product with an Over The Air system or any smart card product with a remote system management.

The invention will be very useful to new business proposals regarding maintenance system.

2. Description of the Related Art

GSM SIM Card manufacturers face a big issue when they have to deal with defect corrections on cards that are already on the field. They provide from thousands up to millions of card to Telecommunications operators. They also provide various kinds of applications with various level of complexity.

Sometimes, even after a long integration and validation phase, a problem is discovered on some of these applications when they are already on the field.

A correction of these defects is very painful for the Telecommunication operators and Card manufacturer industry. Because they have to deal with a huge number of cards, it will always cost a lot of money to correct the defects, even if the problem is minor. In many situations, the cost is so prohibitive that no correction can be done.

A smart card is based on a chip. In the heart of this chip, more particularly in a ROM (Read Only Memory), Card manufacturers put their operating system called "hardmask", and load their applications on a EEPROM (Electrically Erasable programmable Read Only Memory). These applications can be a mix of "softmask" and applets.

A mask is a software dedicated for a smart card microcontroller.

Once the applications are loaded on the card and when the personalization is done, the card is locked. At that time no more softmask applications can be downloaded. With a Java smartcard it is possible to download another applet but the previous one has to be deleted entirely. Cards are released on the field and no further correction can be done. Only smartcard file system management (creation or deletion) is possible with the Over The Air services.

SUMMARY OF THE INVENTION

The goal of the invention is to simplify correction of applications. More particularly, a goal is to reduce cost in time and in money of such correction.

According to the invention, the smartcard comprises a location for storing a file downloaded from a remote entity; the smartcard also comprises a program for performing the following steps:

Before performing data correction in the system, a checking step in which said program (GS) checks whether a file (F) has been downloaded, If such a file (F) is present, the program (GS) modifies the application (APP) on the basis of the data stored in the file (F).

Said program will be able to allow a remote correction. The cards will neither be retrieved from the field nor replaced. This will ease the pain for Card manufacturer and decreased significantly the cost of a correction.

It will be easier to understand the invention on reading the description below, given as an example and referring to the attached drawings.

DESCRIPTION OF THE INVENTION

Figure 1:
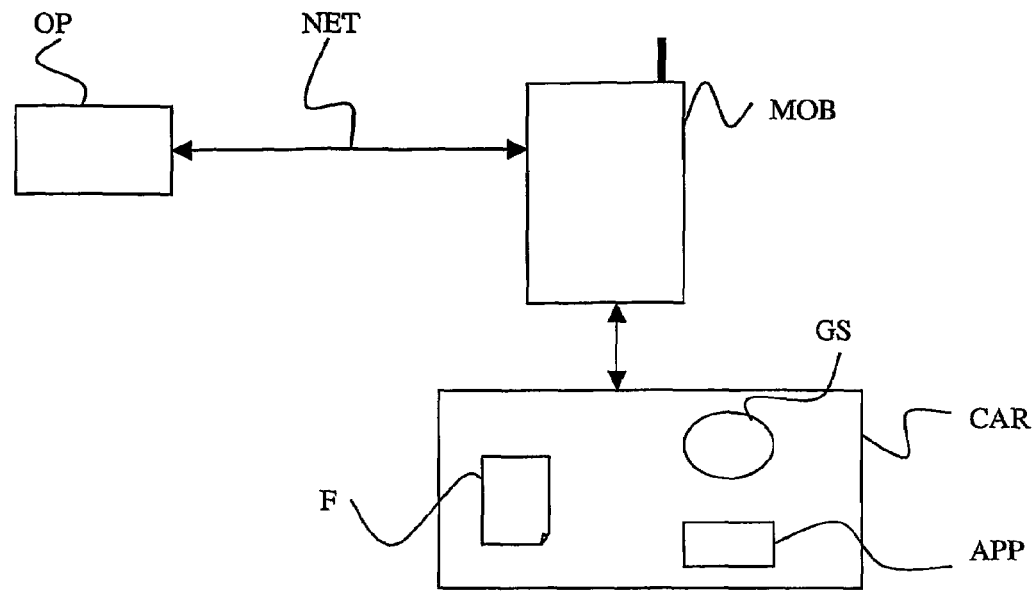
FIG. 1 is a general view of a system in which can be applied the invention.

To simplify the description, the same elements illustrated in the drawings have the same references.

FIG. 1 is a schematic view of a system in which the invention can be applied. This system comprises a SIM card CAR coupled to a mobile phone MOB. An application APP is stored oh the SIM card.

A smartcard includes an electronic module (not shown). The module includes a microcontroller and contacts to communicate with the exterior. The microcontroller generally includes:

a microprocessor to execute commands, non volatile memories ROM (Read Only Memory), whose content is burnt in the factory and therefore cannot be modified. This memory is generally used to store hardmasks;

non volatile memories, for example EEPROM (electrically erasable programmable read only memory). This memory is generally used to store softmasks;

volatile memories RAM, work space to execute the card commands, security units, taking into consideration the power supply voltage, clock speed, etc., a data bus connecting everything, an input-output bus to communicate, in our example of realisation, with the mobile phone MOB.

In our illustrated invention, a telecommunication operator OP communicates with the mobile phone MOB by way of a network NET.

The aim is to update an application APP stored in the card CAR.

According to the invention, the SIM card includes a program GS and a location for storing a file F which can be downloaded from the network into the card.

FIG. 1 illustrates an example in which a file F has been downloaded from the operator into the card CAR. In this example, under a dedicated file DF or a master file MF, a File F with a specific ID (Identifier) and, preferably, with a specific format, will contain the fixing configuration data.

The ID can be chosen at the personalization or be set during the project life, depending on the requirements or the evolution of the project. This file F can be created at any time during the card life, i.e. during the personalisation or, better, while the card is on the field. Since it is a file, this can be done easily thanks to current Over The Air (OTA) services.

The program GS performs the following steps:

A checking-step in which it checks whether a downloaded file F is present on the data processing system; the program (GS) searches for this identifier (ID) for performing a modification of the application (APP).

If such a file is present, a modification step in which the program GS modifies the application on the basis of the data stored in the said file F.

In our example, the program GS is run during the initialisation phase of the card. Preferably, the program GS will be totally executed once and only once. The execution will happen only if fixing configuration data included in a file F are downloaded and stored on the card. If not, the execution will not be performed.

Advantageously, this file F will contains data formatted in such a way that it will be interpreted correctly by the program GS. Automatically, the current application APP stored in the SIM card with a previous behaviour will be replaced with a new one behaviour described in the downloaded file.

Figure 2:
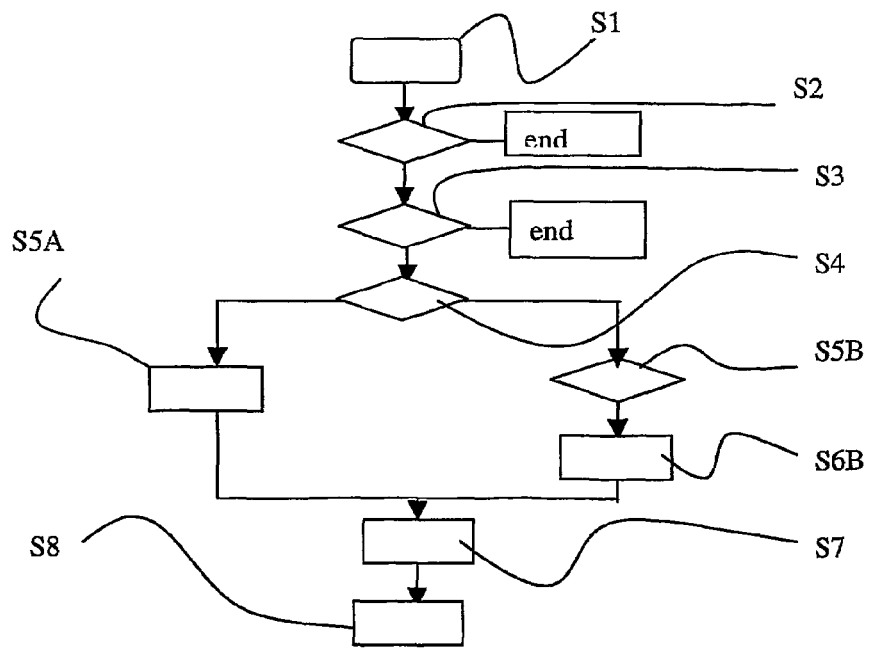
FIG. 2 is an algorithm including different steps illustrating the invention.

FIG. 2 is an algorithm including different steps illustrating the invention.

Considering that it exists a new release of the application APP. For example, the new application includes new APDU (Application Protocol Data Unit) commands. A new softmask (after being fully tested) is re-shaped into a fixing configuration data file F. Once the fixing configuration data file F is created, this one is downloaded, in our example, by way of an Over The Air (OTA) service, from the operator entity into the card CAR. In our example, as mentioned above, the program GS is executed during initialisation. So, next time the mobile phone is switched on, the modification is taken into account.

The steps of the an example illustrating the invention can be the followings:

Step 1 (S1)

The mobile phone is switched on.

Step 2 (S2)

The program GS checks whether a file F with a specific ID is stored in the card. If yes, step 3 is performed; if not, the correction is not performed.

Step 3 (S3)

In our example, the program GS checks whether this file F is activated.

In other words, after the program (GS) has found the identifier (ID), it also checks whether the file (F) is activated or deactivated; if the file is activated, the program (GS) performs the modification (step 4); if the file is deactivated, the program (GS) doesn't perform the modification.

Step 4 (S4)

In our example, advantageously, the program GS checks the type of the correction. If the correction consists in data modification, it performs step 5A; if it consists in a code substitution mechanism, it performs steps 5B&6B.

Step 5A (S5)

Data are modified.

Step 5B (S5B)

The program GS searches for the entry point to use in the fixing configuration file F.

Step 6B (S6B)

Data are substituted.

Step 7 (S7)

Advantageously, after performing the correction, the program GS deactivates and deletes the configuration file F.

Step 8 (S8)

The correction process is finished.

In our example, in reference to FIGS. 1A and 1B, the program GS is run at card initialisation. Nevertheless, we could run it at any time, for example, at successful reception of a SMS (Short Message Service) preferably protected with a 03.48 security layer and a end-to-end encryption for more security. This program could also run when a configuration zone has been updated in the card CAR.

In our embodiment, the program GS detects that a configuration zone exists if it finds the header of this zone in the EEPROM memory. The program also detects that the zone is activated, for example, if inside its header an activated parameter is set.

In our example, two types of corrections can be done: data or code correction. A data correction means application data have to be changed but not the application itself. A code correction means the current code of the application has to be modified.

More specifically, for a data modification, in the configuration zone, the exact address in the EEPROM, the new content and its size have to be stored. With these parameters the program GS proceed to the modification.

For a code modification, in the configuration zone, the address of the previous code in the EEPROM (entry point), the new code content and its size have to be stored. First of all, the program GS deactivates the previous code and then proceeds to the code substitution.

A Configuration zone could be a file formatted as an EEPROM area non directly reachable. This configuration zones could comprise the following parts:

A header including a standard header zone and a security parameter zone;

A configuration body zone, which contains specific data such as number of corrections, types of correction, and for each correction the associated data.

The invention also concerns a computer program (GS) stored in the card CAR comprising code instructions for performing the following steps:

Before performing data correction in said system, it checks whether a file (F) has been downloaded into said system (CAR), If yes, it modifies the application (APP) on the basis of the data stored in the file (F).

We now see that this invention offers other clear advantages. The invention allows a remote modification of applications, in particular correction of errors. The smart card does not have to be physically returned to a centre for making the modification correction.

The program GS is preferably a softmask. This program GS is a generic application remote bug correction system with the above-identified constraints (locked cards, Over The Air services) taken into account. This program will depend on the hardmask (because it will refer to the memory mapping done by the product line group when the hardmask is implemented). This program GS can also be implemented on the hardmask side and become a product feature that may or may not be activated. This program GS will be part of any new applications that will be released (it can also be an option chosen by the customer as a guarantee to solve unknown problems that may occur after the global application validation).

With this program GS and a file F as defined above, depending on the complexity level of the modification and the available size on the card, it will be possible to modify, to change the behaviour of an application APP already on the field. The modification will be transparent to the end-user. And it will be very easy for any Telecommunication operators to do it.

After an analysis of the problem by the operator or the card manufacturer and a feasibility study of the defect fixing, it will be possible for example to say if the problem can be corrected remotely. If it is, the card manufacturer can provide fixing configuration data to the Telecommunication operators, and they can be sent to the cards with, for example, a basic Over The Air service.

This softmask is by itself a value-added service.

Although specific embodiments of the invention have been described and illustrated, the invention is not to be limited to the specific forms or arrangements of parts so descried and illustrated. The invention is limited only by the claims.

The invention claimed is:

1. A smart card coupled to a communication device (MOB) and having the capability of updating applications stored therein by communicating smart card comprising:
    a location for storing a file (F) which can be downloaded from said remote entity;
    a memory containing a program (GS) causing a microcontroller of the smart card to perform:
        a first checking step in which said program (GS) checks whether the file (F) has been downloaded;
        if the file (F) is present, a second checking step in which said program (GS) determines whether the type of correction to be made, is data modification or code substitution; and
        a modifying step in which the program (GS) modifies the application (APP) based on the type of correction identified in the second checking step, the modifying step comprising:
            if the type of correction to be made is data modification then proceeding with modifying data at a specific location using data in the file (F); and
            if the type of correction to be made is code modification then deactivating the previous code and proceeding with a code substitution.

2. A method for operating a microcontroller of a smart card coupled to a communication device (MOB) and having the capability of updating applications stored therein by the communicating with a remote entity (OP), wherein the microcontroller operates according to instructions of a program (GS) to execute the method, the method comprising:
    a first checking step to determine whether a file (F) has been downloaded from said entity into the smart card;
    if the file (F) is present, a second checking step to check to determine whether the type of correction to be made, is data modification or code substitution; and
    a modifying step in which the microcontroller modifies the application (APP) based on the type of correction identified in the second checking step, the modifying step comprising:
        if the type of correction to be made is data modification then proceeding with modifying data at a specific location using data in the file (F); and
        if the type of correction to be made is code modification then deactivating the previous code and proceeding with a code substitution.

3. The method according to claim 2, wherein the microcontroller modifies an application (APP) by writing new code or data and deactivating the previous code or data, based on the type of correction to be made as identified in the second checking step.

4. The method according to claim 2, wherein said file (F) has a predetermined identifier (ID), and wherein the method further comprises searching for this identifier (ID) for performing a modification of the application (APP).

5. The method according to claim 4, further comprising after finding the identifier (ID), checking whether the file (F) is activated or deactivated; if the file is activated, performing the modification; if the file is deactivated, not performing the modification.

6. A Computer program (GS) stored in a smart card coupled to a communication device (CAR), the smart card including a microcontroller comprising code instructions for performing the following steps:
    a first checking step in which said program checks whether a file (F) has been downloaded into the smart card;
    if the file (F) is present, a second checking step in which said program determines the type of correction to be made, is data modification or code substitution; and
    a modifying step in which the program modifies the application (APP) based on the type of correction identified in the second checking step the modifying step comprising:
        if the type of correction to be made is data modification then proceeding with modifying data at a specific location using data in the file (F); and
        if the type of correction to be made is code modification then deactivating the previous code and proceeding with a code substitution.

7. A smart card to store digital information, comprising:
    a memory containing a computer program (GS) comprising code instructions to cause a microcontroller of the smart card to perform the following steps:
        a first checking step in which said program checks whether a file (F) has been downloaded into the smart card;
        if the file (F) is present, a second checking step in which said program determines whether the type of correction to be made, is data modification or code substitution; and
        a modifying step in which the program modifies the application (APP) based on the type of correction identified in the second checking step the modifying step comprising:
            if the type of correction to be made is data modification then proceeding with modifying data at a specific location using data in the file (F); and
            if the type of correction to be made is code modification then deactivating the previous code and proceeding with a code substitution.

* * * * *